(12) United States Patent
Estabrook et al.

(10) Patent No.: US 12,151,402 B2
(45) Date of Patent: Nov. 26, 2024

(54) DEVICE FOR SECURELY HOLDING SINGLE-USE CONTAINERS AND A METHOD OF RECYCLING SINGLE-USE CONTAINERS

(71) Applicant: Cambio Roasters, LLC, Isle of Palms, SC (US)

(72) Inventors: Richard Estabrook, Shelburne, VT (US); Kevin Hartley, Isle of Palms, SC (US)

(73) Assignee: Cambio Roasters, LLC, Isle of Palms, SC (US)

( * ) Notice: Subject to any disclaimer, the term of this patent is extended or adjusted under 35 U.S.C. 154(b) by 0 days.

(21) Appl. No.: 18/603,527

(22) Filed: Mar. 13, 2024

(65) Prior Publication Data

US 2024/0308110 A1    Sep. 19, 2024

Related U.S. Application Data

(60) Provisional application No. 63/452,833, filed on Mar. 17, 2023.

(51) Int. Cl.
*B29B 17/00* (2006.01)
*B65D 30/06* (2006.01)
*B65D 63/10* (2006.01)

(52) U.S. Cl.
CPC .......... *B29B 17/0026* (2013.01); *B65D 29/04* (2013.01); *B65D 63/10* (2013.01)

(58) Field of Classification Search
CPC ...... B29B 17/0026; B65D 29/04; B65D 63/10
USPC .................................................. 206/515, 505
See application file for complete search history.

(56) References Cited

U.S. PATENT DOCUMENTS

| | | | | |
|---|---|---|---|---|
| 3,030,812 A | * | 4/1962 | Lutz | G01F 19/002 7/110 |
| 4,043,203 A | * | 8/1977 | Montesi | G01F 19/002 73/427 |
| 4,477,950 A | * | 10/1984 | Cisek | B65D 63/1027 24/17 AP |
| 4,789,064 A | * | 12/1988 | Segal | A47G 21/02 248/37.3 |
| 11,737,526 B2 | * | 8/2023 | Peterson | A44C 5/2033 24/326 |
| 2012/0031805 A1 | * | 2/2012 | Stolarczyk | A47J 39/006 206/541 |
| 2012/0210541 A1 | * | 8/2012 | Koncelik, Jr. | B65D 63/1018 24/21 |
| 2014/0312035 A1 | | 10/2014 | McGuigan et al. | |

FOREIGN PATENT DOCUMENTS

GB    2475867 A    6/2011
SE    515078 C2    6/2001

* cited by examiner

*Primary Examiner* — Sue A Weaver
(74) *Attorney, Agent, or Firm* — Caldwell Intellectual Property Law

(57) ABSTRACT

A device for recycling single-use containers, the device comprises a mechanical component to securely combine a plurality of single-use containers. In some embodiments, device may be a cable fastener that threads through a plurality of single-use containers. In other embodiments, device may be a strap that holds a plurality of single-use containers together through compression. In other embodiments, device may be a flexible container that gathers a plurality of single-use containers.

20 Claims, 7 Drawing Sheets

DEVICE FOR SECURELY HOLDING SINGLE-USE CONTAINERS AND A METHOD OF RECYCLING SINGLE-USE CONTAINERS

CROSS-REFERENCE TO RELATED APPLICATIONS

This application claims the benefit of priority of U.S. Provisional Patent Application Ser. No. 63/452,833, filed on Mar. 17, 2023, and titled "DEVICE FOR SECURELY HOLDING SINGLE-USE CONTAINERS AND A METHOD OF RECYCLING SINGLE-USE CONTAINERS," which is incorporated by reference herein in its entirety.

FIELD OF THE INVENTION

The present invention generally relates to the field of recycling. In particular, the present invention is directed to a device for securely holding single-use containers and a method of recycling single-use containers.

BACKGROUND

Since the introduction of single use plastics, such as coffee pods, they have faced challenged to be recycled at Municipal Recycling Centers across the USA and Canada. Often times, smaller single use plastics are harder to recycle due to their small size. A smaller sized single use plastic may slip through the recycling machine, causing jams and difficulties at the recycling plant. There is a need for a device that allows for single use plastics to be more efficiently recycled.

SUMMARY OF THE DISCLOSURE

In an aspect, a device for securely holding single-use containers may include a plurality of single-use containers, wherein each single-use container of the plurality of single-use containers comprises a hole; and at least a cable fastener configured to bind the plurality of single-use containers into an attached unit, wherein the attached unit has less volume than the total volume of the plurality of single use containers when the plurality of single use containers are separated, wherein the at least a cable fastener includes a distal end through the holes of the plurality of single-use containers; and a proximal end fastened to the distal end of the at least a cable fastener to create a loop.

In another aspect, a method of recycling single-use containers may include puncturing a plurality of single-use containers using a distal end of at least a cable fastener, wherein the distal end of the at least a cable fastener comprises a sharp point; threading the distal end of the at least a cable fastener through the plurality of single-use containers; and fastening the distal end of the at least a cable fastener to a proximal end of the at least a cable fastener to form a closed loop including an attached unit having less volume than the total volume of the plurality of single use containers when the plurality of single use containers are separated.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to devices and methods for recycling single use containers. Some single use containers may be too small to go through standard recycling machines at Municipal Recycling Centers. Aspects of the present disclose can be used to securely combine multiple single-use containers to form a larger object big enough to pass through size-sortation technologies in Municipal Recycling Centers. Aspects of the present disclosure include devices for securing single-use containers which can also be recycled with the single use containers. Exemplary embodiments illustrating aspects of the present disclosure are described below in the context of several specific examples.

Figure 1:
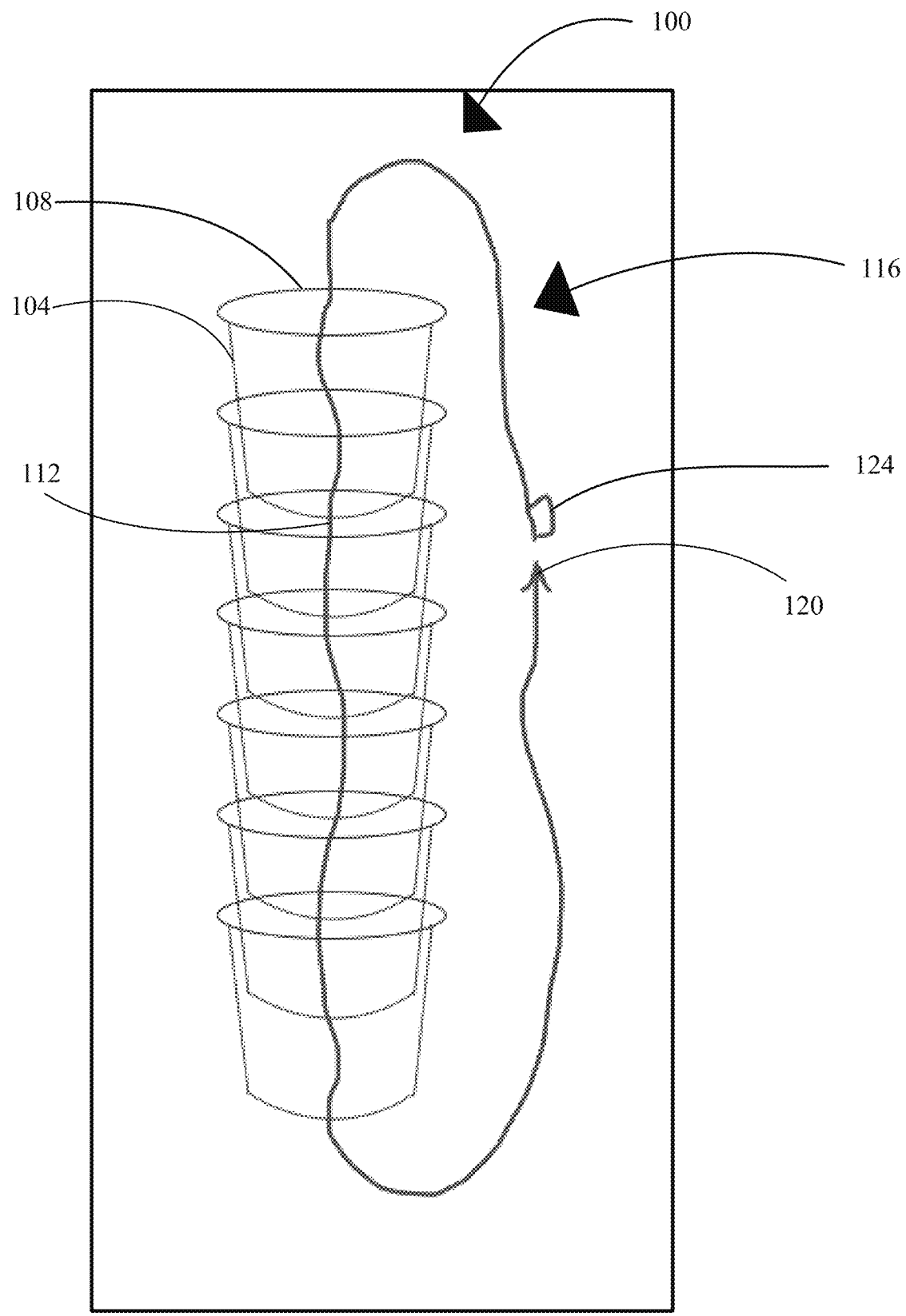
FIG. 1 is a representative embodiment of a device for recycling single use containers.

Referring now to FIG. 1, an exemplary embodiment of a device 100 for recycling at least a single-use container is illustrated. A "single use container," as used herein, is an object that is designed to be thrown away after one use. In some embodiments, at least a single use container may include a container such as a cup. At least a single-use container 104 may include coffee pods, such as K-CUPS or NESPRESSO capsules, cups, takeout containers, food containers, and the like. At least a single-use container 104 may be made of recyclable materials. Recyclable materials may include aluminum, polypropylene (PP), polyethylene terephthalate (PET), high density polyethylene (HDPE), polylactic acid (PLA), wood fiber, bamboo, palm leaf, and the like. In some embodiments, each single use container of a plurality of single use containers may be made of recyclable materials. In some embodiments, each single use container of a plurality of single use containers may be made of recyclable materials of the same recyclable material category. As used herein, a "recyclable material category" is a set of materials which is recycled according to the same method. In some embodiments, at least a single-use container 104 may have a concave shape. At least a single-use container 104 may include an open end 108. Open end 108 may include a concave shape. At least a single-use container 104 (also referred to as container) may be tapered such that more than one single use container 104 may be stacked, wherein the bottom of one single-use container 104 may be placed through the top of another single-use container 104.

Bottom of single-use container 104 may be rounded such that it is convex. The center of a convex curve at the bottom of single-use container 104 may be at the center of the single-use container 104 along one or more horizontal axes when single-use container 104 is positioned upright (such as when open end 108 faces upward). This may aid in space efficient stacking of single use containers.

Continuing to reference FIG. 1, single-use container 104 may include a hole 112. Hole 112 may be placed at the center of the bottom of the single-use container 104. Hole 112 may be off center from the bottom of single-use container 104. Hole 112 may be at the center of the bottom of single-use container 104. Hole 112 may be created using a piercing tool, such as a needle gun, a hole punch, or another sharp object. Hole 112 may be created by placing the single-use container 104 in a machine that includes a hole punch, needle gun, or the like. Hole 112 may be 0.01 mm, 0.001 mm, or 0.1 mm in diameter. Hole 112 may be wide enough for distal end of a cable fastener to fit through, as described below. Hole 112 may be placed at the same location for more than one single-use container 104. Hole 112 may be aligned across a plurality of single use containers for ease of threading a cable fastener through a series of such holes of stacked containers. In a non-limiting example, a stack of circular containers may be rotated such that their holes are aligned. In some embodiments, one or more single use containers 104 may include a snap together feature, and such snap together feature may be used to maintain alignment of holes.

Still referencing FIG. 1, device 100 may include a cable fastener 116. Cable fastener 116 may include a distal end 120 and a proximal end 124. Distal end 120 may include a sharp end, such as a needle point. Distal end 120 may be used to puncture through at least one single-use container 104, creating hole 112. Distal end 120 may be threaded through one or more single use containers 104. Distal end 120 may be joined to the proximal end 124 of the cable fastener 116. Proximal end 124 of the cable fastener 116 may include a fastening mechanism, such that the distal end 120 may be fastened to the proximal end 124 of the cable fastener 116. The fastening of the distal end 120 to the proximal end 124 may create a "loop", as shown in FIG. 1, wherein the single-use container 104 is in the loop. Proximal end 124 may also include a release mechanism so that the proximal end 124 may be separated from the distal end 120. In some embodiments, once the proximal end 124 and the distal end 120 are connected, they may not be disconnected. In some embodiments, sharp end of distal end 120 may be hidden and/or removed upon fastening distal end 120 to proximal end 124. For example, distal end 120 may include a mechanism for snapping off sharp end. In some embodiments, proximal end 124 may include a concave shape into which sharp end may fit. Hiding and/or removing sharp end of proximal end 124 may improve safety of device 100 and/or may prevent sharp end from piercing flexible container described below, in the event that cable fastener 116 and flexible container are in the same system.

Still referring to FIG. 1, in some embodiments, proximal end 124 of cable fastener 116 may include a mechanism for securing cable fastener 116 such that, once distal end 120 is inserted into a loop of proximal end 124, distal end 120 cannot be removed from such loop. In some embodiments, such a mechanism may allow cable fastener to be tightened, such as by pulling distal end 120 further through loop, but not loosened. In a non-limiting example, cable fastener 116 may include a ridged surface, and a mechanism for securing cable fastener 116 may include a component which catches on a ridge of the ridged surface when one attempts to remove distal end from loop, preventing distal end 120 from being removed. In some embodiments, such a mechanism may allow cable fastener 116 to be tightly secured to contain differing size stacks of single-use containers 104.

Continuing to reference FIG. 1, cable fastener 116, including the distal end 120 and the proximal end 124, may be composed of recyclable materials, such as those discussed above. Cable fastener 116 may be composed of the same recyclable material category as the single-use container 104 such that both components may go through the same recycling process. Cable fastener 116 may be the same diameter or slightly smaller than hole 112. Cable fastener 116 may be 0.01 mm, 0.001, mm, or 0.1 mm, or the like. Cable fastener 116 may be composed of a rigid material or a flexible material. Cable fastener 116 may be used to "string together" a plurality of containers. In an embodiment, there may be 10 containers connected to one cable fastener 116. In another embodiment, there may be 100 containers connected to one cable fastener 116. In another embodiment, there may be 50 containers connected to one cable fastener 116. In an embodiment, cable fastener 116 may be used to combine several containers to create a larger physical size, compared to just one container.

Still referring to FIG. 1, at least a cable fastener 116 may be configured to bind a plurality of single-use containers into an attached unit. As used herein, an "attached unit" is a plurality of single-use containers which are connected in a manner that makes them unlikely to unintentionally become separated. An attached unit of single-use containers may include a stack of single-use containers. An attached unit of single-use containers may include a plurality of single-use containers organized such that the attached unit has less volume than the total volume of the plurality of single use containers when the plurality of single use containers are separated. For example, more single-use containers in the form of attached units may be placed within a given volume than single-use containers placed in another volume of the same size in a disorganized, non-stacked manner.

Figure 2:
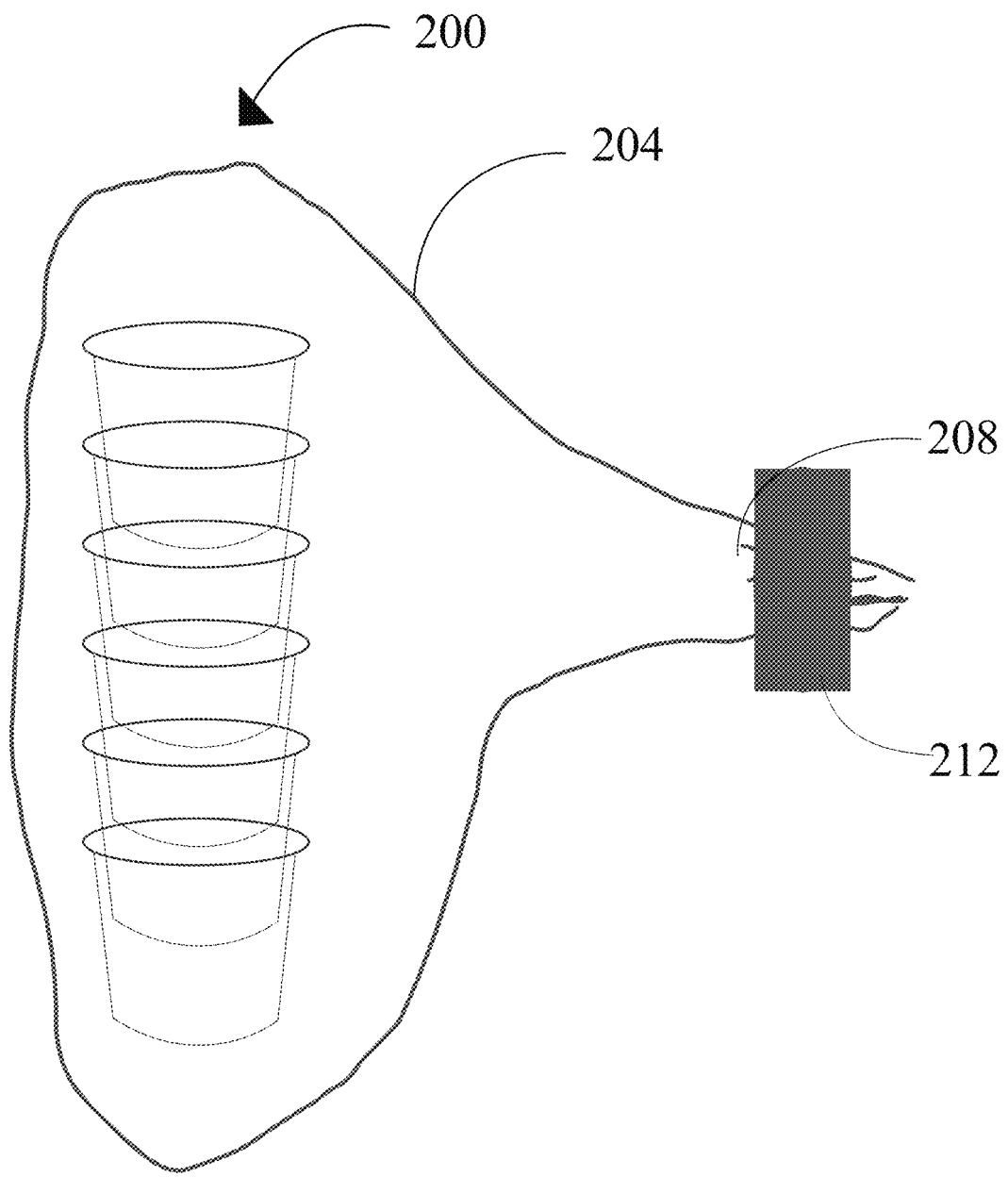
FIG. 2 is a representative embodiment of a device for storing a plurality of containers.

Now referencing FIG. 2, an exemplary embodiment of a device 200 which contains a plurality of single use containers using a flexible container 204 is provided. Flexible container 204 may have dimensions large enough to encompass more than one single-use container 104. For example, flexible container 204 may be long enough to encompass more than one single-use container 104. In some embodiments, flexible container 204 may contain 10 containers. In other embodiments, flexible container 204 may contain 100 containers. In other embodiments, flexible container 204 may contain 50 containers. Single-use container 104 may be placed loosely within flexible container 204, such that it is in no particular orientation within container 204. A plurality of single use containers 104 may be stacked within flexible container 204 in a manner as discussed above. FIG. 2 depicts stacked single use containers within flexible container 204. Flexible container 204 may be made of recyclable materials such as PP, as discussed above. In some embodiments, flexible container 204 may be composed of a recyclable material of the same recyclable material category as flexible single-use container 104 and/or cable fastener 116. This may enable entirety of device 200 to be recycled according to the same process. Flexible container 204 may have a thickness of 2 mils, 1 mil, 2.5 mils, or the like. In some embodiments, flexible container 204 may be made of the same material as single-use container 104, such that they may be recycled together. In some embodiments, flexible container 204 may include a mesh. Use of a mesh may, for example, allow flexible container 204 to have increased flexibility, and/or may allow a use to more easily see into flexible container 204. In some embodiments, flexible container 204 may encompass one or more stacks of single use containers 104. In some embodiments, flexible container 204 may encompass one or more stacks of single use containers 104, wherein one or more such stacks are held together using cable fastener 116. Flexible container 204 may include an opening 208. Single use container 104 may be placed into and/or removed from flexible container 204 through opening 208. Opening 208 may be located on any side or portion of flexible container 204. Opening 208 may be sealed, permanently or temporarily. Opening 208 may be sealed by a closure 212.

Still referencing FIG. 2, device 200 may include a closure 212. Closure 212 may be located on opening 208. Closure 212 may be composed of any recyclable material, such as those discussed above. Closure 212 may be composed of recyclable material of the same recyclable material category as flexible container 204 and/or single-use container 104. Closure 212 may seal opening 208, preventing single-use container 104 from falling out of flexible container 204. Closure 212 may be oval shaped, circular, or the like. In some embodiments, closure 212 may be clamp-like, such that a user and/or machine may crimp the closure 212 to seal the opening 208. Closure 212 may seal opening 208 using a "tightening" mechanism. In an embodiment, closure 212 may be circular or oval shaped and a machine and/or user may tighten closure 212 to seal opening 208.

Figure 3:
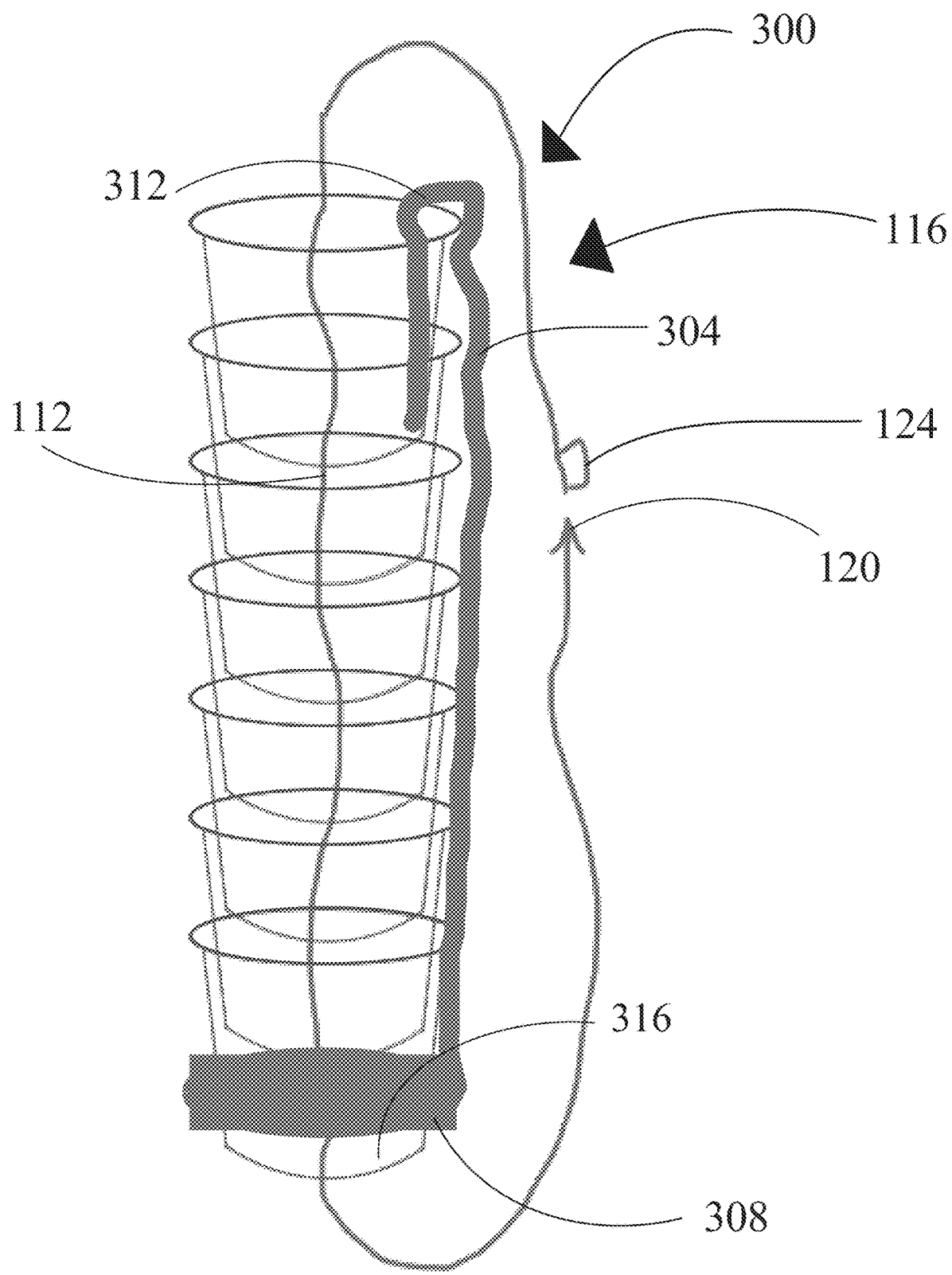
FIG. 3 is a representative embodiment of a device for storing a plurality of containers including a strap.

Now referencing FIG. 3, an exemplary embodiment of a device 300 for containing a plurality of containers using a strap 304 is provided. Strap 304 may be used to hold a plurality of single use containers. Single-use container 104 may be stacked as described above. Device 300 may have a stack of 10 containers, 50 containers, 100 containers, or the like. Stack of containers may be held together with strap 304. Strap 304 may be composed of a recyclable material, such as those discussed above. Strap 304 may be composed of recyclable material of the same recyclable material category as that of single use container 104. Strap 304 may be equal to or greater than the length of a stack of containers. Strap 304 may be rigid, to provide structure to stack of containers. Strap 304 may follow the shape of stack of containers. Strap 304 may be free to rotate around the stack of containers.

Continuing to reference FIG. 3, strap 304 may include a holder 308. Holder 308 may be located at the bottom of the strap. Holder 308 may be used to hold on to the bottom most single-use container 316 of stack of containers. Holder 308 may match a shape of bottom most single-use container 316. Holder 308 may be circular in shape. In other embodiments, holder 308 may be rectangular in shape. Holder 308 may be sized such that it fits around bottom most single-use container 316. For example, holder 308 may fit around the middle of bottom most single-use container 316. Holder 308 may be sized such that it fits around a section of bottom most single-use container 316 below the middle. Holder 308 may be rigid, such that it holds its shape. Holder may be semi-rigid, such that it may be able to conform to the exact shape of bottom most single-use container 316, to ensure a secure fit.

Continuing to reference FIG. 3, strap 304 may include a clip 312. Clip 312 may be located at the top of the strap. Clip 312 may attach to a top single-use container 104 of a stack of containers. For example, clip 312 may be used to clip onto a top rim of first single-use container 104 of a stack of containers. In some embodiments, clip 312 may resemble a "u" shape, such that the curve of the "u" fits over the top of the single-use container 104 and/or onto a rim of single-use container 104. In other embodiments, clip may be similar in shape to the holder 308. Clip 312 may be rigid. Clip 312 may be semi-rigid, such that it may be able to be molded and/or manually affixed to a top container of a stack of containers. The combination of clip 312 and holder 308 may securely hold the stack of containers, such that no container may escape the stack.

Figure 4:
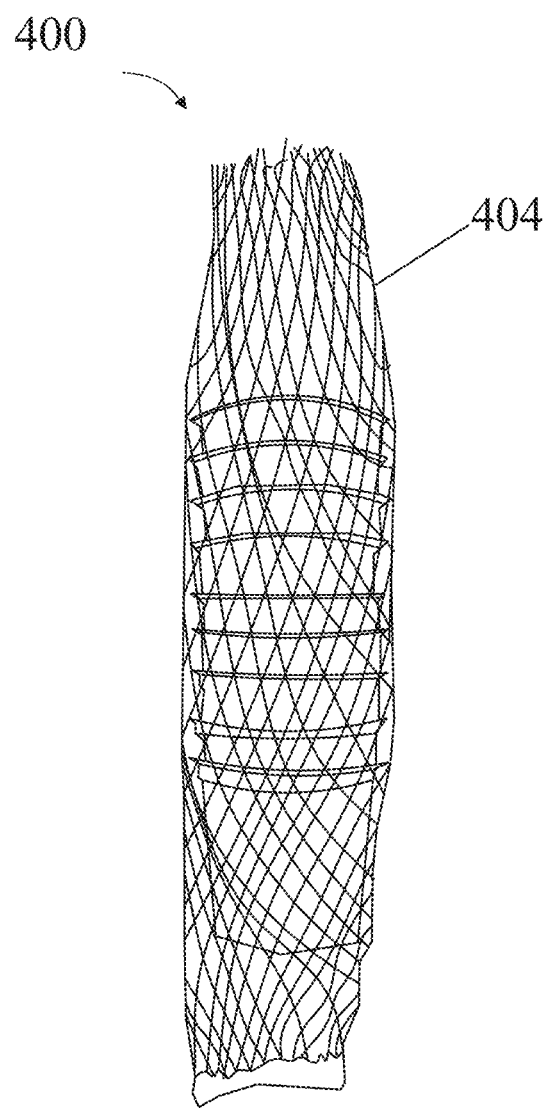
FIG. 4 is a representative embodiment of a device for holding a plurality of containers.

Now referencing FIG. 4, an exemplary embodiment of a device 400 for securely holding a plurality of containers. Device 400 includes a tube 404. Tube 404 may hold the single-use container 104, or a plurality of containers with slight tension, preventing single-use container 104 from falling out of tube 404. Tube 404 may be composed of recyclable materials, as discussed above, such as PP. Tube 404 and single-use container 104 may each be composed of a recyclable material of the same recyclable material category. Tube 404 may have a distal end and a proximal end, wherein the distal end may be sealed, such that only the proximal end is open. Alternatively, the opposite may be true, such that the distal end is open, and the proximal end is sealed. Alternatively, both the distal and the proximal end may be open, such that the containers may be inserted from either end. Tube 404 may be rigid to ensure that there is slight tension and/or pressure on the containers within. Tube 404 may also be flexible, wherein the tube may stretch around the containers to securely contain the containers. Tube 404 may include holes to create a mesh-like structure. This may allow more flexibility in the tube such that the tube may conform around the plurality of containers. This may also allow a user to see how full of single use containers tube 404 is.

Figure 5:
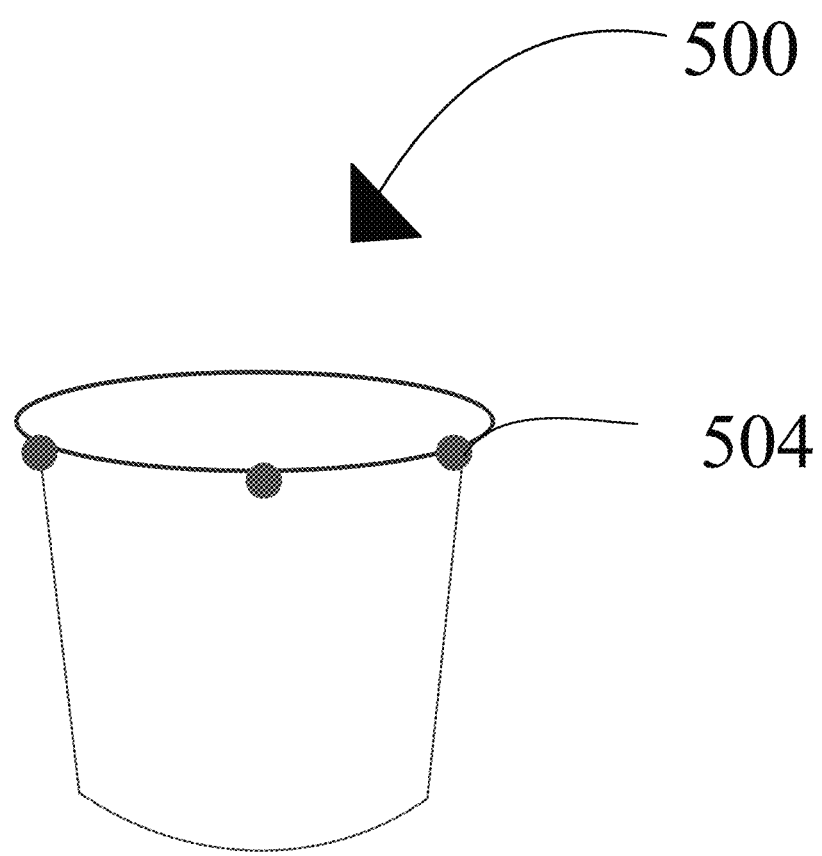
FIG. 5 is a representative embodiment of a container with a snap together feature.

Now referencing FIG. 5, an exemplary embodiment of a single-use container 500 with a snap-together feature is provided. Single-use container 500 may be composed of recyclable materials, such as those as discussed above, including but not limited to, polypropylene. In some embodiments, each container of a stack of single-use containers 500 may be composed of recyclable material of the same recyclable material category. Single-use container 500 may include a mechanical feature 504 (also referred to as a "feature"). In some embodiments, feature 504 may be located along the rim of single-use container 500, as shown in FIG. 5. In other embodiments, feature 504 may be located on the outside of the single-use container 500, such as around the middle of the container. Feature 504 may also be located along the inside of single-use container 500. Feature 504 may be used to mechanically snap together two or more containers, to form a stack of containers. Feature 504 may use pressure to snap together two or more containers. In an embodiment, feature 504 may include a perimeter of beads, spaces 1 cm, 0.1, cm, or the like apart. Beads may snap together with the beads on a second single-use container 500, such that there is a snap fit, and the two containers may not be separated unintentionally. In another embodiment, feature 504 may include detents places along the rim, or other parts of single-use container 500. A "detent", as used herein, is a device for positioning and holding one mechanical part in relation to another in a manner such that the device can only be released using force applied to one of the mechanical parts. A detent may include a spring-loaded ball, wherein the spring may only be released by a purposeful force to one of the two containers snapped together. Single-use container 500 may include a plurality of detents. In non-limiting examples, a plurality of detents may be arranged in a straight pattern or a staggered pattern. In some embodiments, single-use container 500 may include one or more channels and/or threads positioned along exterior surface of single-use container 500.

One or more features of a single-use container may be consistent with any feature disclosed in U.S. patent application Ser. No. 18/599,862 filed on Mar. 8, 2024 and titled "HIGHLY RECYCLABLE BEVERAGE PODS AND METHOD OF MANUFACTURE," the entirety of which is hereby incorporated by reference.

In an embodiment, single-use container 104 as discussed above may include features as discussed in FIG. 5. Single-use container 500 may be used in any of the devices as discussed above.

In some embodiments, a device described herein may be sized such that the device is large enough to fit through a hole designed for a single-use container. For example, a device may have a width of less than about 3 inches, 3.5 inches, 4 inches, 4.5 inches, 5 inches, 5.5 inches, 6 inches, or less. In a non-limiting example, a device described herein including a stack of single use containers may be placed in a recycling bin through a hole approximately 4 inches in diameter. In some embodiments, a device described herein may be large enough to be recognized as a recyclable material of sufficient size by a size-sorting mechanism. For example, a device may have a width of at least 1.5 inches, 2 inches, 2.5 inches, 3 inches, 3.5 inches, 4 inches, or more. In an example, a device may have a height of at least 1.5 inches, 2 inches, 2.5 inches, 3 inches, 3.5 inches, 4 inches, 4.5 inches, 5 inches, 5.5 inches, 6 inches, or more.

In some embodiments, single use container and/or a device for holding single use containers described herein may be flattened. In some embodiments, this may allow for more single use containers and/or devices to fit into the same space. For example, single use containers of system 200 may be flattened, allowing additional single use containers to fit within flexible container.

In some embodiments, one or more devices for holding single use containers described herein may be combined. In some embodiments, this may reduce a chance that single use containers fall off a device. For example, containers including snap-together features may be used with strap 308. In another example, a stack of containers strung together using cable fastener 116 may be placed within flexible container 204.

Figure 6:
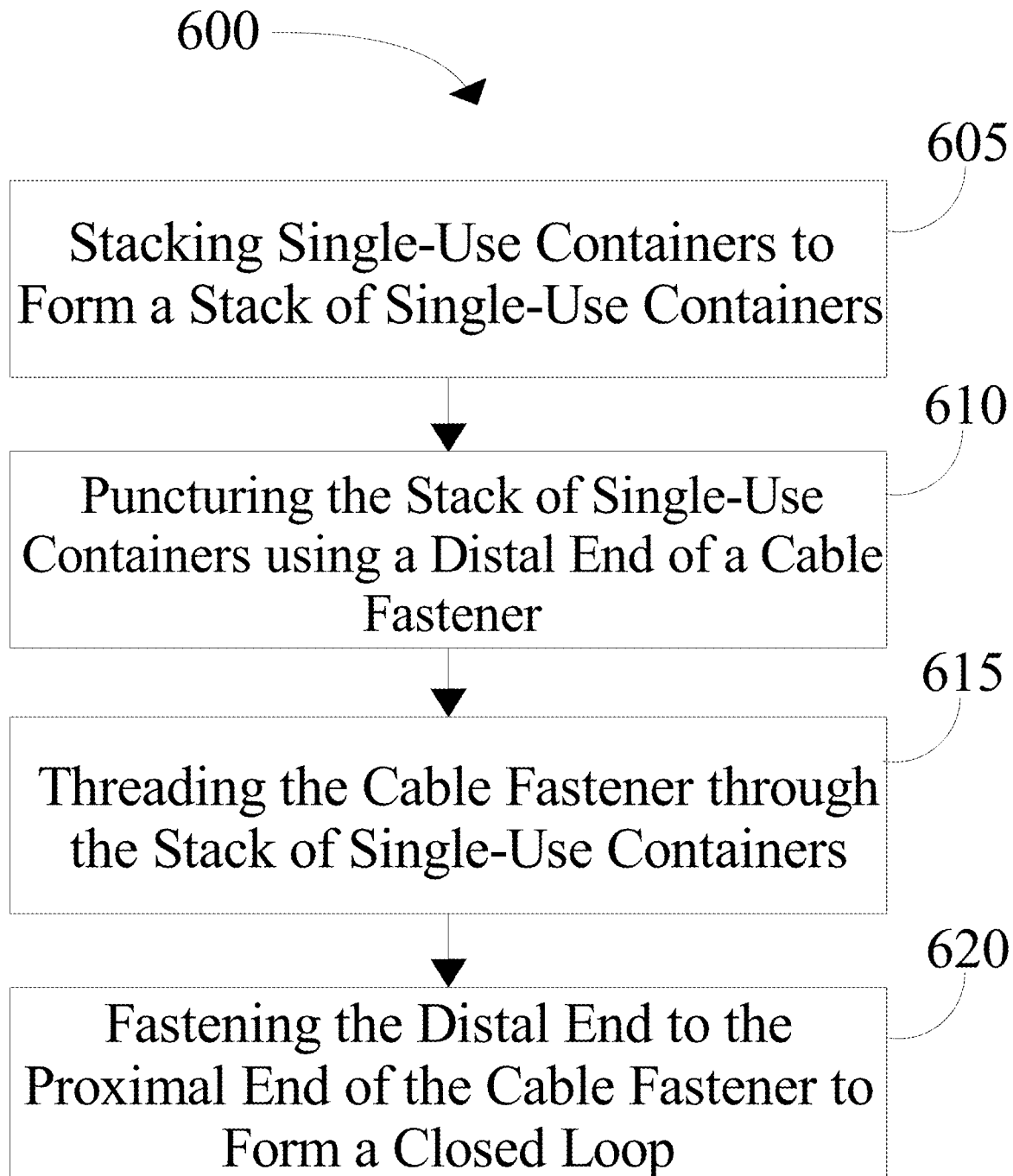
FIG. 6 is a flow diagram of an exemplary embodiment of a method of recycling single use containers.

Now referring to FIG. 6, an exemplary method 600 of recycling single-use containers is provided. Step 605 of method 600 includes stacking at least two single-use containers to form a stack of single-use container. Stacking may include placing the bottom of one container into the top of another container, to form a vertical stack. Single-use containers may have features, as discussed in FIG. 5, wherein they may lock together to form a secure stack. Mechanical features may require that single-use containers be placed in a specific orientation to lock two or more containers together.

Continuing to reference FIG. 6, step 610 of method 600 includes puncturing the stack of single-use containers using a distal end of a cable fastener. Distal end of the cable fastener may include a sharp point that is used to create a hole in the single-use container. Hole may be big enough to allow cable fastener to slide through it.

Continuing to reference FIG. 6, step 615 of method 600 includes threading the cable fastener through the stack of single-use containers. In an embodiment, the stack of single-use containers may be contained on the cable fastener, much like beads on a necklace. Threading the cable fastener through the stack of single use containers prevents the single-use containers from separating.

Continuing to reference FIG. 6, step 620 of method 600 includes fastening the distal end to a proximal end of a cable fastener to form a closed loop. To prevent the single-use containers from escaping the cable fastener, the cable fastener may form a closed loop. The proximal end of a cable fastener may include a fastening mechanism. In an embodiment, a fastening mechanism may include a one-way "head", such that when the distal end is threaded through the head, it cannot be removed.

Figure 7:
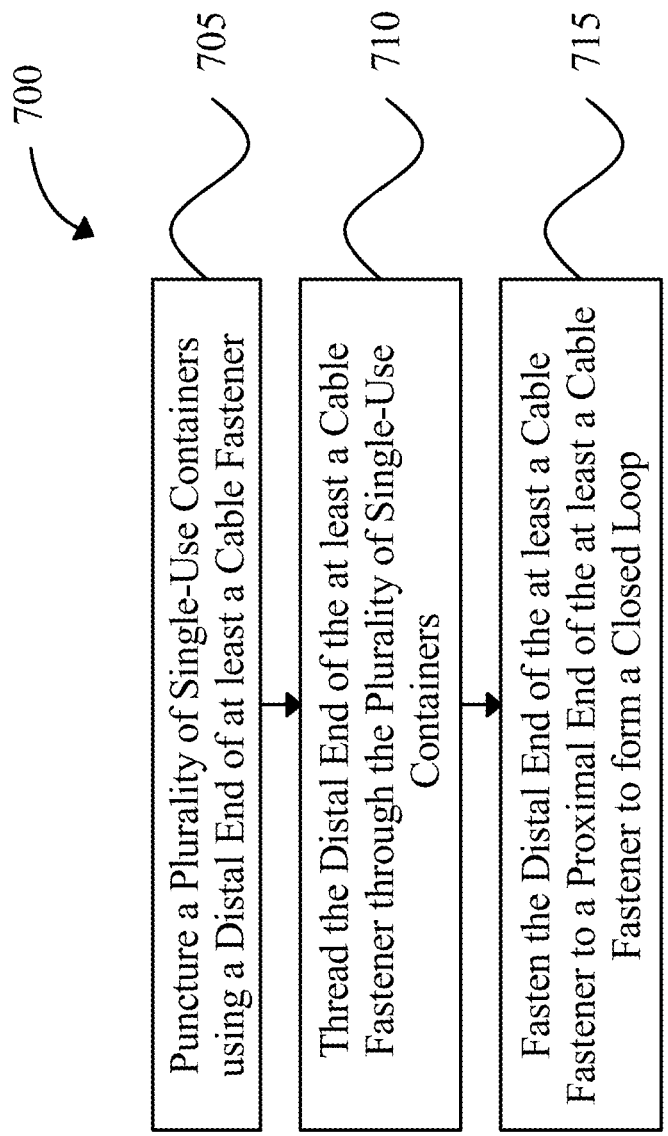
FIG. 7 is a flow diagram of an exemplary embodiment of a method of recycling single use containers.

Referring now to FIG. 7, an exemplary embodiment of method 700 of recycling single-use containers is illustrated. One or more steps if method 700 may be implemented, without limitation, as described with reference to other figures.

Still referring to FIG. 7, in some embodiments, method 700 may include puncturing a plurality of single-use containers using a distal end of at least a cable fastener 705. In some embodiments, the distal end of the at least a cable fastener includes a sharp point.

Still referring to FIG. 7, in some embodiments, method 700 may include threading the distal end of the at least a cable fastener through the plurality of single-use containers 710. In some embodiments, each single-use container of the plurality of single-use containers and the at least a cable fastener are each made of recyclable material of the same recyclable material category. In some embodiments, a plurality of single-use containers includes a plurality of stacked single-use containers. In some embodiments, each single-use container of the plurality of single-use containers includes a snap-together feature to securely stack the plurality of single-use containers.

Still referring to FIG. 7, in some embodiments, method 700 may include fastening the distal end of the at least a cable fastener to a proximal end of the at least a cable fastener to form a closed loop 715. In some embodiments, closed loop may include an attached unit having less volume than the total volume of the plurality of single use containers when the plurality of single use containers are separated.

Still referring to FIG. 7, in some embodiments, method 700 may further include securing the plurality of stacked single-use containers using a strap, wherein the strap includes a holder which fits around a bottom single-use container of the plurality of single-use containers; and a clip which attaches to a rim of a top single-use container of the plurality of single-use containers. In some embodiments, the plurality of single-use containers, the at least a cable fastener, and the strap are each made of recyclable material of the same recyclable material category.

Still referring to FIG. 7, in some embodiments, method 700 may further include securing the plurality of single-use containers using a flexible container surrounding the plurality of single-use containers, wherein the flexible container includes a closure to seal an opening of the flexible container. In some embodiments, the plurality of single-use containers, the at least a cable fastener, and the flexible container are each made of recyclable material of the same recyclable material category.

Still referring to FIG. 7, in some embodiments, method 700 may further include securing the plurality of single-use containers using a mesh tube surrounding the plurality of single-use containers, wherein the mesh tube conforms around the shape of the plurality of single-use containers. In some embodiments, the plurality of single-use containers, the at least a cable fastener, and the mesh tube are each made of recyclable material of the same recyclable material category.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve devices and methods according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A device for securely holding single-use containers, the device comprising:
   a plurality of single-use containers, wherein each single-use container of the plurality of single-use containers comprises a hole; and
   at least a cable fastener configured to bind the plurality of single-use containers into an attached unit, wherein the attached unit has less volume than a total volume of the plurality of single use containers when the plurality of single-use containers are separated, wherein the at least a cable fastener comprises:
      a distal end configured to be threaded through the holes of the plurality of single-use containers, the distal end of the at least a cable fastener comprises a sharp point configured to puncture the holes in the plurality of single-use containers; and
      a proximal end fastened to the distal end of the at least a cable fastener to create a loop.

2. The device of claim 1, wherein each single-use container of the plurality of single-use containers and the at least a cable fastener are each made of recyclable material of the same recyclable material category.

3. The device of claim 1, wherein the plurality of single-use containers comprises a plurality of stacked single-use containers.

4. The device of claim 1, wherein each single-use container of the plurality of single-use containers comprises a snap-together feature to securely stack the plurality of single-use containers.

5. The device of claim 1, wherein the device further comprises a strap, wherein the strap comprises:
   a holder which fits around a bottom single-use container of the plurality of single-use containers; and
   a clip which attaches to a rim of a top single-use container of the plurality of single-use containers.

6. The device of claim 5, wherein the plurality of single-use containers, the at least a cable fastener, and the strap are each made of recyclable material of the same recyclable material category.

7. The device of claim 1, wherein the device further comprises a flexible container surrounding the plurality of single-use containers, wherein the flexible container comprises a closure to seal an opening of the flexible container.

8. The device of claim 7, wherein the plurality of single-use containers, the at least a cable fastener, and the flexible container are each made of recyclable material of the same recyclable material category.

9. The device of claim 1, wherein the device further comprises a mesh tube surrounding the plurality of single-use containers, wherein the mesh tube conforms around a shape of the at plurality of single-use containers.

10. The device of claim 9, wherein the plurality of single-use containers, the at least a cable fastener, and the mesh tube are each made of recyclable material of the same recyclable material category.

11. A method of recycling single-use containers, the method comprising:
    puncturing a plurality of single-use containers using a distal end of at least a cable fastener, wherein the distal end of the at least a cable fastener comprises a sharp point;
    threading the distal end of the at least a cable fastener through the plurality of single-use containers; and
    fastening the distal end of the at least a cable fastener to a proximal end of the at least a cable fastener to form a closed loop including an attached unit having less volume than a total volume of the plurality of single-use containers when the plurality of single use containers are separated.

12. The method of claim 11, wherein each single-use container of the plurality of single-use containers and the at least a cable fastener are each made of recyclable material of the same recyclable material category.

13. The method of claim 11, wherein the plurality of single-use containers comprises a plurality of stacked single-use containers.

14. The method of claim 11, wherein each single-use container of the plurality of single-use containers comprises a snap-together feature to securely stack the plurality of single-use containers.

15. The method of claim 11, wherein the method further comprises securing the plurality of stacked single-use containers using a strap, wherein the strap comprises:
    a holder which fits around a bottom single-use container of the plurality of single-use containers; and
    a clip which attaches to a rim of a top single-use container of the plurality of single-use containers.

16. The method of claim 15, wherein the plurality of single-use containers, the at least a cable fastener, and the strap are each made of recyclable material of the same recyclable material category.

17. The method of claim 11, wherein the method further comprises securing the plurality of single-use containers using a flexible container surrounding the plurality of single-use containers, wherein the flexible container comprises a closure to seal an opening of the flexible container.

18. The method of claim 17, wherein the plurality of single-use containers, the at least a cable fastener, and the flexible container are each made of recyclable material of the same recyclable material category.

19. The method of claim 11, wherein the method further comprises securing the plurality of single-use containers using a mesh tube surrounding the plurality of single-use containers, wherein the mesh tube conforms around a shape of the plurality of single-use containers.

20. The method of claim 19, wherein the plurality of single-use containers, the at least a cable fastener, and the mesh tube are each made of recyclable material of the same recyclable material category.

* * * * *